US007367423B2

(12) United States Patent
Ferrell et al.

(10) Patent No.: US 7,367,423 B2
(45) Date of Patent: May 6, 2008

(54) SPEAKER ASSEMBLY WITH AIMING DEVICE

(75) Inventors: Barron Ferrell, Orange, CA (US); Francois Godfrey, Oceanside, CA (US); Bernie Hawkins, Long Beach, CA (US); John Brodie, Costa Mesa, CA (US)

(73) Assignee: QSC Audio Products, Inc., Costa Mesa, CA (US)

( * ) Notice: Subject to any disclaimer, the term of this patent is extended or adjusted under 35 U.S.C. 154(b) by 335 days.

(21) Appl. No.: 10/973,649

(22) Filed: Oct. 25, 2004

(65) Prior Publication Data

US 2006/0086562 A1 Apr. 27, 2006

(51) Int. Cl.
*G10K 11/02* (2006.01)
*G10K 11/35* (2006.01)
*H04R 1/20* (2006.01)
*H04R 1/32* (2006.01)
*E04B 1/99* (2006.01)
*H04R 5/02* (2006.01)
*G01C 15/00* (2006.01)

(52) U.S. Cl. ........................ 181/187; 181/30; 381/387; 381/304; 33/286

(58) Field of Classification Search ................ 181/187, 181/30; 381/387, 304, 300, 332; 33/286
See application file for complete search history.

(56) References Cited

U.S. PATENT DOCUMENTS 4,139,734 A * 2/1979 Fincham ..................... 381/335
4,569,076 A * 2/1986 Holman ....................... 381/82
5,885,129 A * 3/1999 Norris ........................ 446/405
6,513,622 B1 * 2/2003 Gelow et al. ............... 181/152
7,090,047 B1 * 8/2006 Lee et al. ................... 181/199
2001/0029675 A1 * 10/2001 Webb .......................... 33/286
2002/0025053 A1 * 2/2002 Lydecker et al. ........... 381/305
2005/0035246 A1 * 2/2005 Coleman .................... 248/131

FOREIGN PATENT DOCUMENTS

WO WO 2004016039 A1 * 2/2004

OTHER PUBLICATIONS

"Sound Aligment-System", May 2002, Checkpoint Tools Product Review.*

* cited by examiner

*Primary Examiner*—Edgardo San Martin
(74) *Attorney, Agent, or Firm*—Perkins Coie LLP

(57) ABSTRACT

A speaker assembly aimable relative to a remote target. The speaker assembly comprising a sound generating device configured to project sound in a sound pattern about a sound axis. A speaker aiming device is coupled to the sound generating device for use in visually aiming the sound generating device relative to the remote target. The speaker aiming device having first and second aiming portions spaced apart from each other and positioned along an aiming axis in a fixed orientation relative to the sound axis. The first and second aiming portions being positioned to allow a user to visually see along the aiming axis past the first and second portions aiming device to the remote target.

36 Claims, 5 Drawing Sheets

SPEAKER ASSEMBLY WITH AIMING DEVICE

TECHNICAL FIELD

The present invention relates to sound systems, and more particularly to loudspeaker assemblies that can be aimed at selected target areas.

BACKGROUND

Loudspeaker assemblies project sound in a pattern based in part upon the size and shape of the speaker components. Large loudspeakers are often used in public venues, such as cinemas, to provide high quality sound into the cinema's viewing area. Conventional cinema screens are perforated so they are substantially acoustically transparent. Loudspeaker assemblies are typically mounted behind the screen at about two thirds the screen's height and project sound forwardly toward the seating or viewing area. The loudspeaker assemblies can be positioned to enhance the illusion that the sound is emanating from the visual images on the screen. The loudspeaker assemblies, however, are typically large, heavy, and cumbersome to manipulate during installation behind the screen.

The loudspeaker assemblies are designed to create broad sound patterns that cover the seating area when the loudspeaker assemblies are properly aimed. The process of aiming the loudspeaker assemblies is often very tedious and inexact. The aiming process is often completed by iterations over a series of manual estimates between a person in the seating area listening to the sound emanating from behind the screen and another person physically moving the loudspeaker. Aiming systems having a laser mounted to the loudspeaker assembly have been used to aim the loudspeaker. These laser aiming systems, however, increase the cost of the loudspeaker. And, the cinema screen typically blocks the laser light, even though the screen is perforated. The present invention, embodiments of which are discussed below and shown in FIGS. 1-10, overcome the drawbacks experienced in the prior art.

DETAILED DESCRIPTION

Loudspeaker assemblies having aiming devices for use in aiming at the speaker assemblies relative to a selected target in accordance with embodiments of the present invention are described in detail below and shown in FIGS. 1-10. In the following description, the term loudspeaker will be used interchangeably with the shortened term "speaker." Also, numerous specific details are discussed to provide a thorough and enabling description for embodiments of the invention. One skilled in the relevant technology area, however, will recognize that the invention can be practiced without one or more of the specific details. In other instances, well-known structures or operations are not shown or are not described in detail to avoid obscuring aspects of the embodiments. In general, alternatives and alternate embodiments described herein are substantially similar to the previously described embodiments, and the common elements are identified by the same reference numbers.

Figure 1:
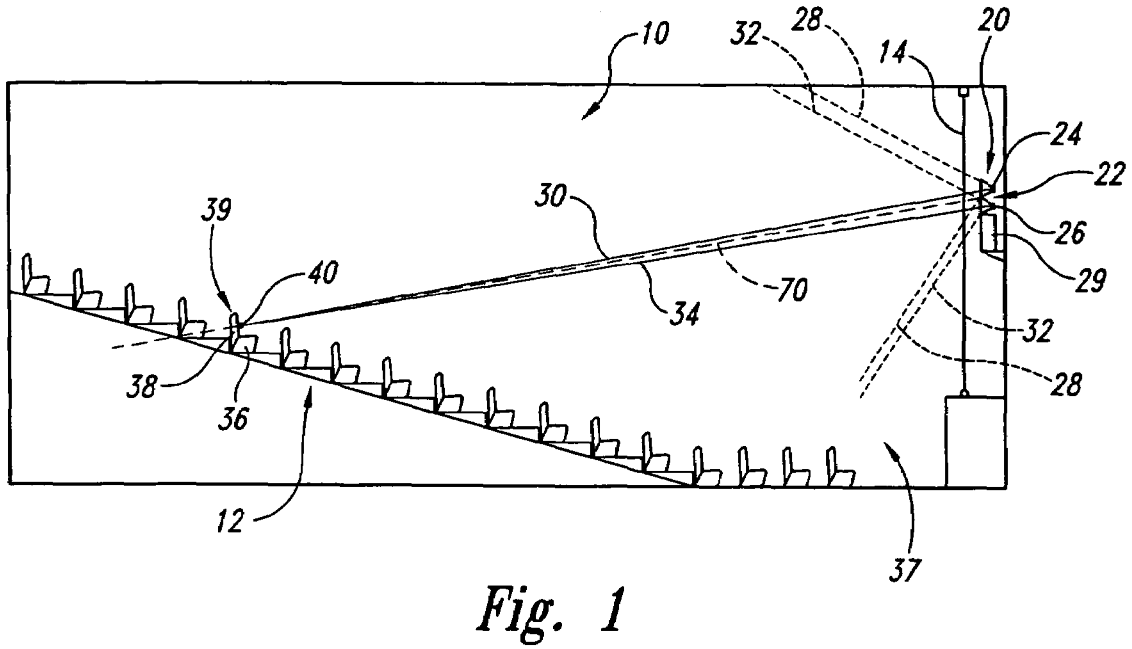
FIG. 1 is a schematic side elevation view of a cinema having a perforated screen between a seating area and an aimable loudspeaker assembly in accordance with an embodiment of the present invention.

FIG. 1 is a schematic side elevation view of a cinema 10 having a speaker assembly 20 in accordance with one embodiment mounted behind a perforated screen 14. A viewing area 12 is in front of the screen. The speaker assembly 20 projects sound forwardly in selected sound patterns through the screen 14 into the seating area 12. The speaker assembly 20 includes components that can be moved and adjusted to aim the sound pattern(s) relative to a selected target. As discussed in greater detail below, the speaker assembly 20 includes an aiming device 50 through which a person can look to aim the speaker assembly and its sound patterns relative to a selected target, for example in the cinema's viewing area 12.

Figure 2:
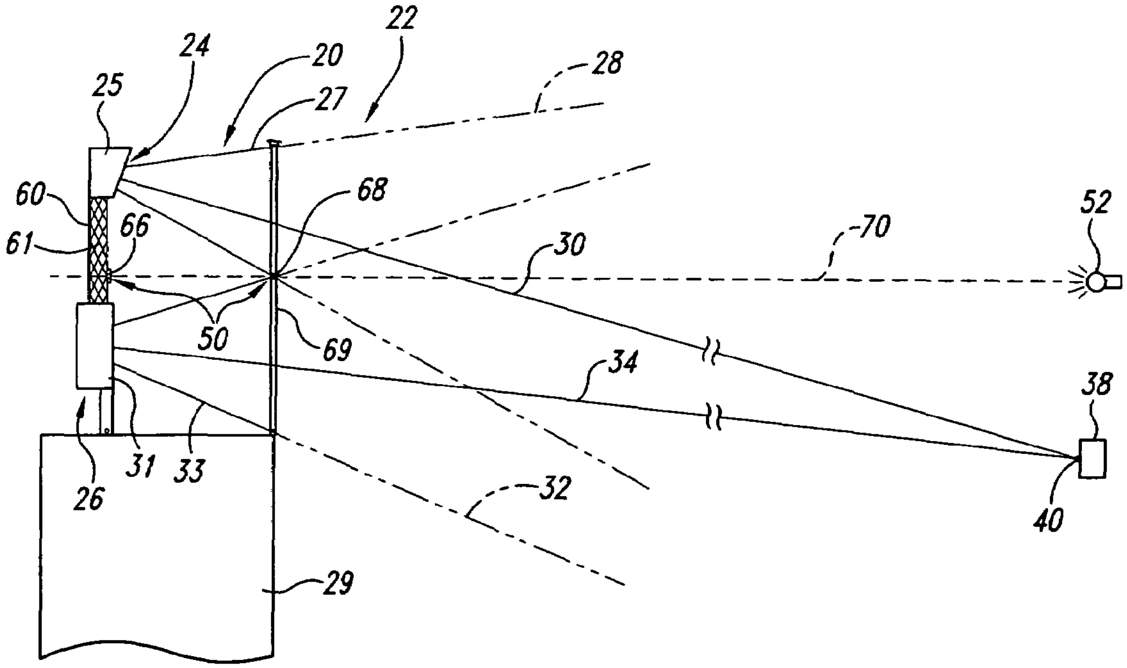
FIG. 2 is an enlarged schematic side elevation view of the loudspeaker assembly of FIG. 1 showing sound patterns projecting from a horn array.
Figure 3:
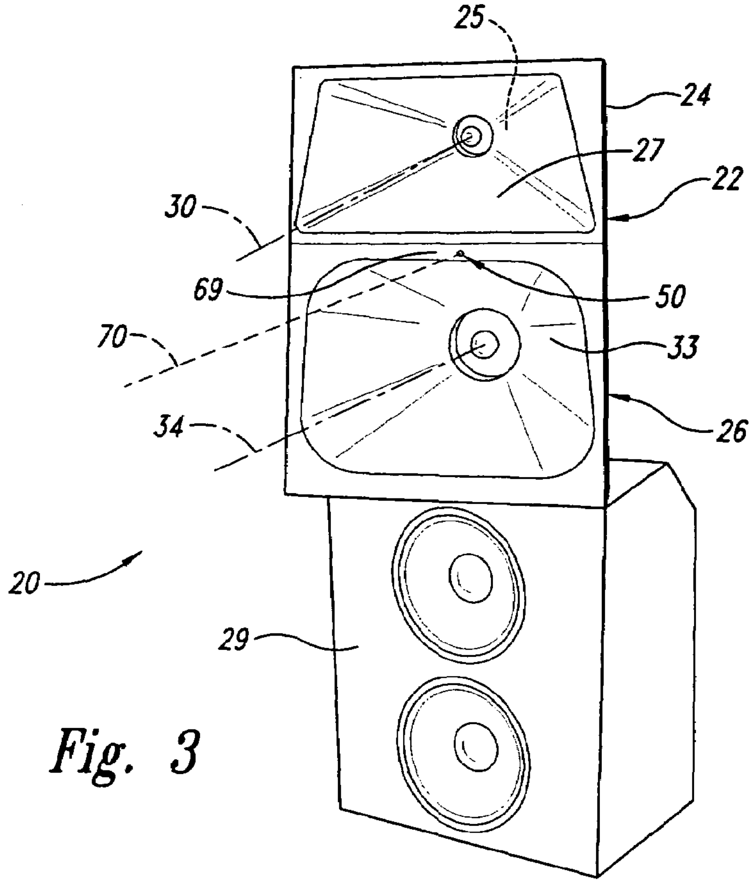
FIG. 3 is an enlarged front isometric view of the loudspeaker assembly of FIG. 2.
Figure 4:
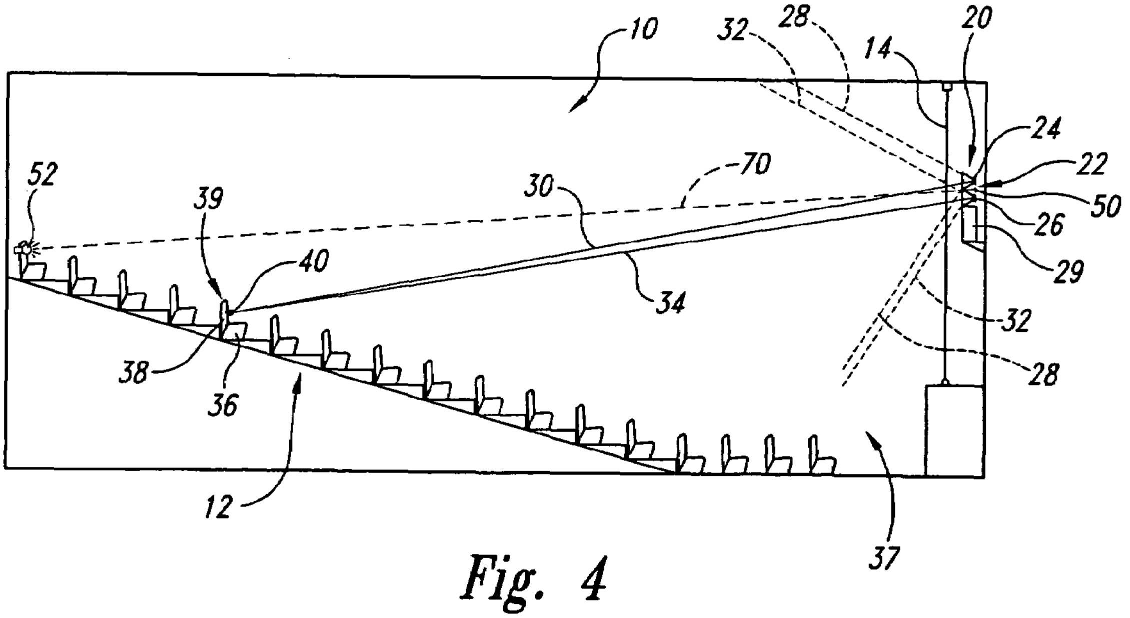
FIG. 4 is a schematic side elevation view of a cinema with an aimable loudspeaker assembly in accordance with another embodiment.

As best seen in FIG. 2, the speaker assembly 20 includes a horn array 22 having a high frequency speaker 24 positioned immediately above a mid-frequency speaker 26. The horn array 22 is adjustably mounted atop a low-frequency speaker 29. Accordingly, the speaker assembly 20 is a three-way assembly. Other embodiments can have two-way speaker assemblies, a single speaker, or any combination of speakers.

The high frequency speaker 24 of the illustrated embodiment includes a driver 25 that generates and projects, high frequency sound (e.g., roughly the range of 1000 Hz to 10,000 Hz) through a shaped high frequency horn 27. The high frequency speaker 24 projects a high frequency sound pattern 28 forwardly through the screen 14 and into the viewing area 12. The sound pattern 28 is shaped and generally symmetrical about a high frequency sound axis 30 perpendicularly oriented relative to the high frequency driver 25.

The mid-frequency speaker 26 includes a driver 31 that generates and projects mid-frequency sound (e.g., roughly 200 Hz to 2,000 Hz) through a shaped mid-frequency horn 33. The mid-frequency speaker 26 projects a sound pattern 32 forwardly through the screen 14 and into the viewing area 12. The mid-frequency sound pattern 32 is shaped and is generally symmetrical about a mid-frequency sound axis 34 perpendicularly oriented relative to the mid-frequency driver 31.

The high frequency sound pattern 28 and the mid-frequency sound pattern 32 of the illustrated embodiment are shaped to overlap and cover the viewing area 12 with a desirable blend of sound frequencies when the speakers are properly aimed toward the viewing area. The high frequency and mid-frequency sound patterns 28 and 32 are at known orientations relative to each other. That orientation can be different for speaker assemblies with different intended uses.

When the speaker assembly 20 is installed, such as behind the perforated screen 14, the horn array 22 is carefully aimed relative to a target 38 in the viewing area 12. In the illustrated embodiment, the horn array 22 is carefully aimed because its sound blend is more susceptible to positional variations of the high frequency and mid-frequency sound patterns 28 and 32.

The horn array 22 is adjustable relative to a vertical plane and to a horizontal plane, thereby adjusting the high and mid-frequency sound axes 30 and 34 vertically or horizontally relative to the viewing area 12. For example, the horn array 22 could be panned (i.e., pivoted horizontally) to move the high and mid-frequency sound axes 30 and 34 left or right relative to the viewing area 12. The horn array 22 could also be tilted forwardly or rearwardly to move the high and mid-frequency sound axes 30 and 34 up or down relative to the viewing area 12.

The speaker assembly 20 of the illustrated embodiment includes at least one or more support assemblies with a dual axis pivotal rotation adjustment or a tilt adjustment, as disclosed in U.S. Provisional Patent Application No. 60/622,153, entitled SUPPORT ASSEMBLIES WITH ROTATION ADJUSTMENT AND ASSOCIATED METHODS, filed concurrently herewith, or in U.S. Provisional Patent Application No. 60/622,109, entitled SUPPORT ASSEMBLIES WITH TILT ADJUSTMENT AND ASSOCIATED METHODS, filed concurrently herewith, and both of which are hereby incorporated by reference herein in their entireties.

In the embodiment illustrated in FIGS. 1 and 2, the high frequency speaker 24 and the mid-frequency speaker 26 are oriented so the high frequency sound axis 30 and the mid-frequency sound axis 34 converge and intersect at a remote sound axis intersection 40. In one embodiment as an example, the speaker assembly 20 is configured so that, when the front face of the horn array 22 is substantially vertical, the high frequency speaker 24 points downwardly with its sound axis 30 approximately 10° below horizontal. The mid-frequency speaker 26 points downwardly with its sound axis 34 approximately 8° below horizontal. This difference in the orientation of sound axes results in the sound axis intersection 40 at a location remote from the front of the speaker assembly 20. In one embodiment, the horn array 22 is configured so that the sound axis intersection 40 is in the range of approximately 25-100 feet from the horn array. In another embodiment, the sound axis intersection 40 is in the range of approximately 40-60 feet from the horn array 22. In another embodiment, the sound axis intersection 40 is approximately 50 feet from the horn array 22. The speaker assembly 20 in yet other embodiments can be configured so the sound axis intersection 40 is closer to or further from the horn array 22.

When the speaker assembly 20 is installed, the horn array 22 is aimed so the sound axis intersection 40 is positioned at a selected remote location relative to the viewing area 12. In the embodiment in FIG. 1 as an illustrative example, the horn array 22 is aimed so the sound axis intersection 40 is located at approximately a selected center seat in a center seat row 36 approximately two-thirds of the way up from the front 37 of the viewing area 12. This selected center seat is referred to below as the target seat 39. The reader is to understand that the speaker assembly 20 could be aimed toward any other selected target area.

The speaker assembly 20 includes an aiming device 50 coupled to the horn array 22 for use in aiming the speaker array and sound axes 30 and 34 relative to a selected target. The aiming device 50 has sighting features that allow a user to physically look through the aiming device along an aiming axis 70 to align the aiming axis with an aiming target 52. The aiming device 50 is mounted so that, when the aiming axis 70 is aligned with the aiming target 52, the sound axis intersection 40 is positioned at a selected target, which may or may not be the aiming target. As a result, the sound axes 30 and 34, and the corresponding sound patterns 28 and 32 are accurately positioned relative to the viewing area 12.

In the embodiment in FIG. 1, the aiming device 50 is coupled to the speaker assembly 20 in a known orientation so that the sound axis intersection 40 is substantially aligned with the aiming axis 70. In another embodiment shown in FIG. 4, the aiming device 50 is coupled to the speaker assembly 20 so that the sound axis intersection 40 is spaced apart from the aiming axis 70. More specifically, the aiming device 50 is oriented so that the aiming axis 70 is vertically higher than the sound axis intersection 40. For example, the aiming device 50 is positioned such that, when the user aims the aiming axis 70 at the aiming target 52 which is a center seat in the uppermost center seat row in the viewing area 12, the sound axis intersection 40 is positioned at the target seat 39 in the center of the seat row 36.

The aiming device 50 can also be oriented on the speaker assembly 20 so that the aiming axis 70, the high frequency sound axis 30, and the mid-frequency sound axis 34 are all substantially vertically aligned in a common vertical plane normal to the face of the horn array 22. In other embodiments, the aiming device 50 can be positioned at a known orientation with respect to the high and mid-frequency sound axes 30 and 34, but vertically or horizontally misaligned with one or all of the sound axes.

Figure 5:
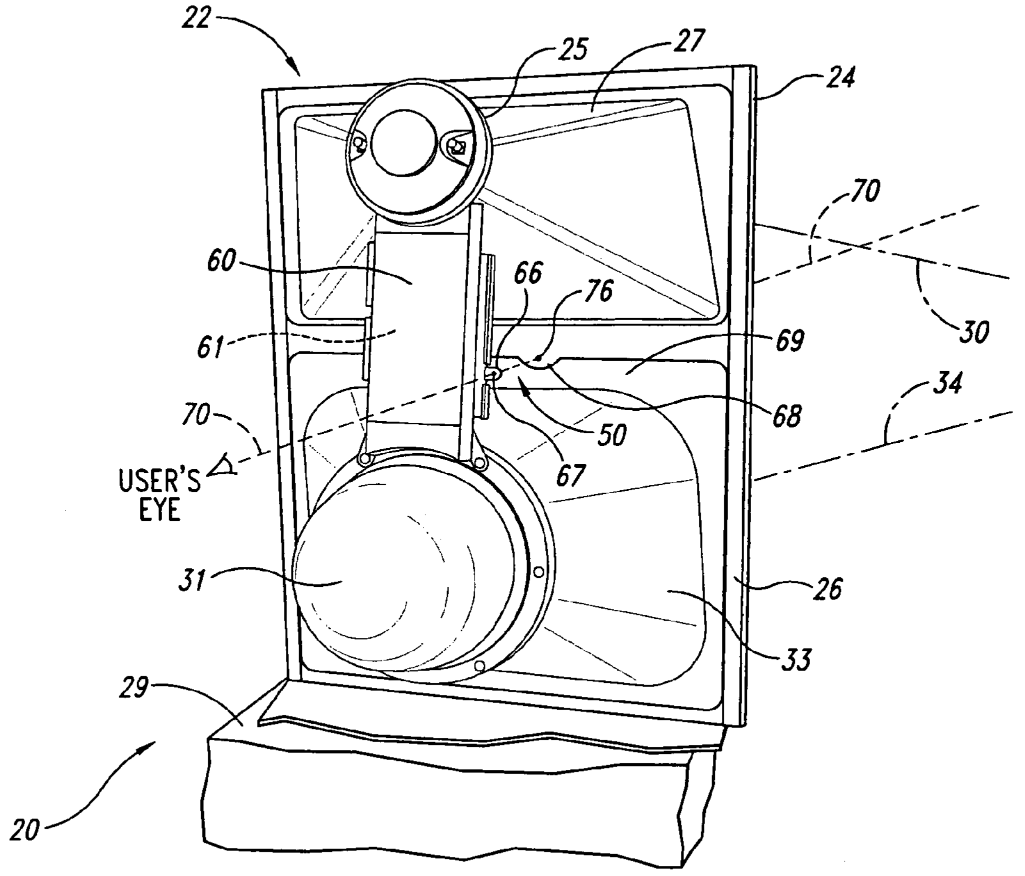
FIG. 5 is an enlarged rear isometric view of the loudspeaker assembly of FIG. 2 showing the horn array and a loudspeaker aiming device.

FIG. 5 is an enlarged rear isometric view of the speaker assembly 20 showing the backside of the horn array 22 and the speaker aiming device 50. The high frequency speaker 24 of illustrated embodiment is "stacked" on the mid-frequency speaker 26. The high frequency driver 25 and the mid-frequency driver 31 are interconnected by a bracket 60 that contains cross-over circuitry 61 connected to the drivers.

Figure 6:
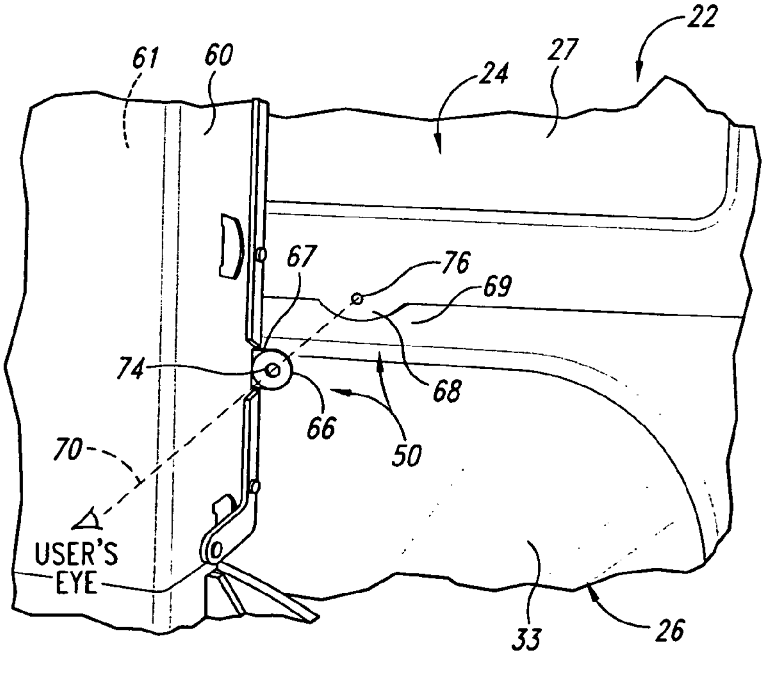
FIG. 6 is an enlarged rear isometric view of the loudspeaker assembly of FIG. 5 with the loudspeaker aiming device.

The aiming device 50 in the illustrated embodiment shown in FIG. 6 includes a first aiming portion 66 connected to the cross over bracket 60 and spaced apart from a second aiming portion 68. These first and second aiming portions 66 and 68 are aligned with and/or define the aiming axis 70. The aiming device 50 is configured so a user positioned behind the horn array 22 can look along the aiming axis 70 through the first and second aiming portions 66 and 68 toward a selected aiming target 52 in front of the speaker assembly.

In the illustrated embodiment, the first aiming portion 66 is a tab 67 attached to the cross-over bracket 60 and spaced apart from the mid-frequency horn 33. The tab 67 has a rear sighting hole 74 coaxially aligned with the aiming axis 70. The second aiming portion 68 is integrally formed in an upper portion 69 of the mid-frequency horn 33. The second aiming portion 68 has a front sighting hole 76 coaxially aligned with the aiming axis 70. The rear and front sighting holes 74 and 76 are configured to allow a person to look through them and along the aiming axis 70 and determine whether the aiming axis is aligned with the aiming target 52. If needed, the horn array 22 or the entire speaker assembly 20 can be rotated and/or tilted to move the aiming axis 70 relative to the aiming target 52 until they are aligned. In one embodiment, one or both of the aiming portions 66 and 68 can be independently adjustable relative to the horn array 22. This adjustability allows for fine tuning of the aiming device 50 to ensure accurate aiming of the aiming axis 70 relative to the selected aiming target 52.

The aiming device 50 is particularly well suited for use in a cinema, because the cinema screen 14 (FIG. 1) is perforated enough to allow the user to see through screen as they are looking through the aiming device 50 into the viewing area 12. For example, the aiming device 50 of the illustrated embodiment allows a user to look through the aiming device 50 along the aiming axis 70, through the perforated screen 14 (FIG. 1) at an illuminated aiming target 52, such as a flashlight, in a darkened viewing area 12. Other embodiments can use other aiming targets 52 that are sufficiently visible to a user looking through the aiming device 50.

Figure 7:
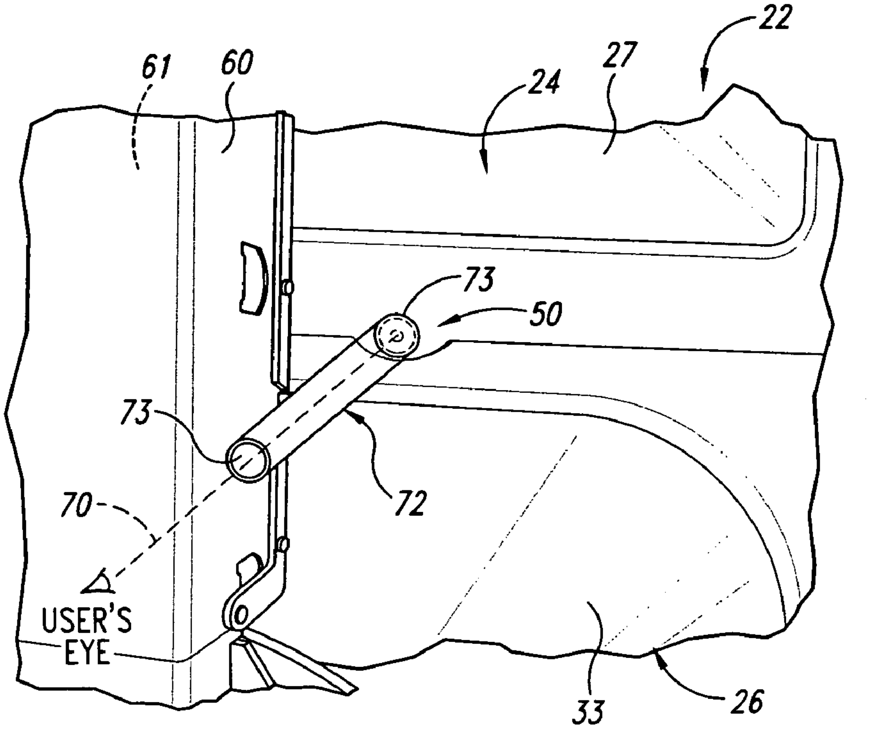
FIG. 7 is an enlarged rear isometric view of the loudspeaker assembly of FIG. 5 with an aiming device in accordance with another embodiment.

FIG. 7 is an enlarged rear isometric view of the speaker assembly 20 with an aiming device 50 on the horn array 22 in accordance with another embodiment. The aiming device 50 includes an elongated tube 72 coaxially aligned with the aiming axis 70. The tube 72 has two spaced apart open ends 73 forming spaced apart first and second portions through which a user can look when aiming the horn array 22. The tube 72 in the illustrated embodiment is attached to the bracket 60 and extends through an upper portion of the mid-frequency horn 33. In one embodiment, a portion of the tube 72 can be an integral part of the mid-frequency horn 33. In another embodiment, the tube 72 can be in or adjacent to an aperture in the mid-frequency horn 33 or other portion of the speaker assembly 20. In yet another embodiment, the aiming device 50, such as the tube 72 or other embodiments, discussed below, can be mounted at a different location on the speaker assembly 20. For example, the aiming device 50 could be mounted to the stop of the speaker array 22.

Figure 8:
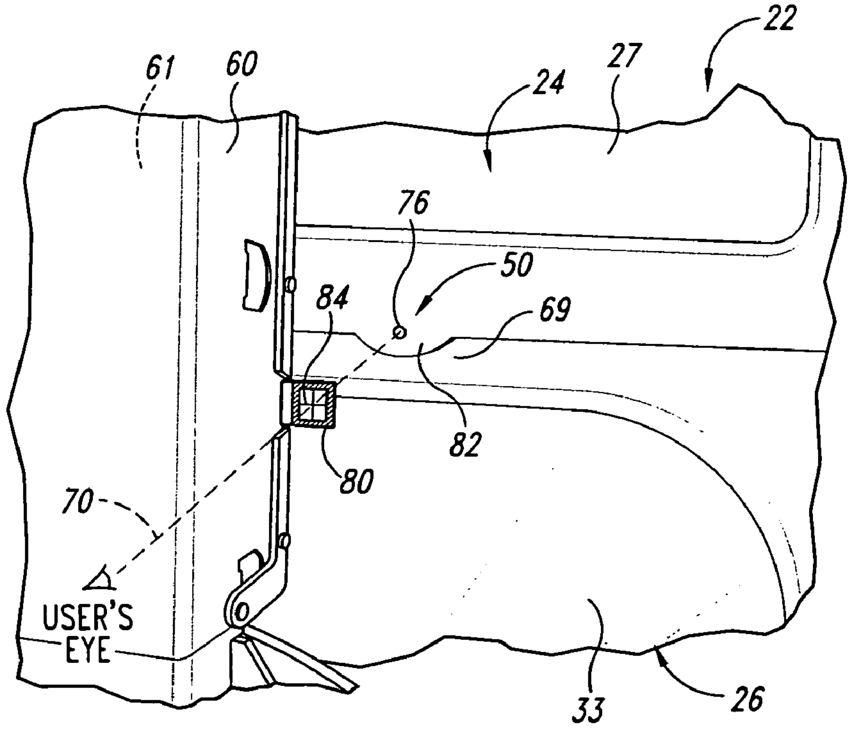
FIG. 8 is an enlarged rear isometric view of the loudspeaker assembly of FIG. 5 with an aiming device in accordance with another embodiment.

FIG. 8 is an enlarged rear isometric view of the speaker assembly 20 with an aiming device 50 in accordance with another embodiment. In this embodiment, the aiming device 50 is coupled to the speaker array and has spaced apart first and second aiming portions 80 and 82 that define and/or are coaxially aligned with the aiming axis 70. The first and second aiming portions 80 and 82 could be separate from each other, or they could be integrally connected to each other. The first aiming portion 80 includes cross hairs 84 that intersect each other at the aiming axis 70. In another embodiment, the second aiming portion 82 instead can include crosshairs 84 aligned with the aiming axis 70. In yet another embodiment, the first and second aiming portions 80 and 82 can each include crosshairs 84 aligned with the aiming axis 70. The crosshairs 84 allow the user to visually position the crosshairs at the selected aiming target 52, thereby having precise visual confirmation regarding alignment of the aiming axis 70 with the aiming target.

Figure 9:
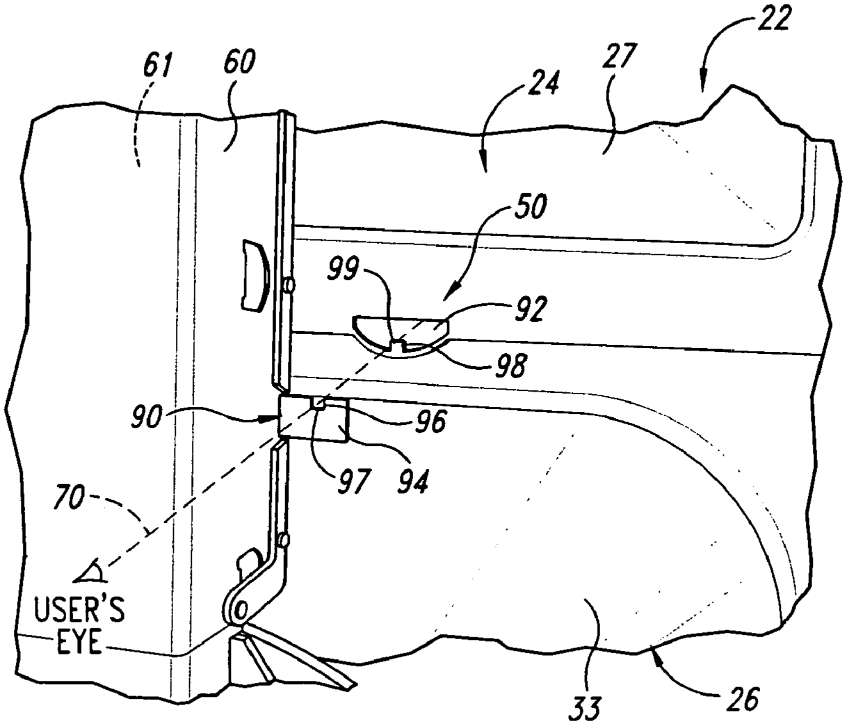
FIG. 9 is an enlarged rear isometric view of the loudspeaker assembly of FIG. 5 with an aiming device in accordance with another embodiment.

FIG. 9 is an enlarged rear isometric view of the speaker assembly 20 with an aiming device 50 in accordance with yet another embodiment. In this embodiment, the aiming device 50 is attached to the speaker array 22 and has spaced apart first and second aiming portions 90 and 92 that define and/or are aligned with the aiming axis 70. The first and second aiming portions 90 and 92 could be separate from each other, or they could be integrally connected to each other. The first aiming portion 90 includes a plate 94 having a notch 96 formed in it. The plate 94 is positioned so the aiming axis 70 extends through the notch 96. In one embodiment, the plate 94 is positioned so a lower surface 97 of the notch 96 substantially corresponds to the aiming axis 50. In another embodiment, the notch 96 could be configured so the aiming axis 50 extends through the center of the notch.

The second aiming portion 92 has a peg 98 with a top surface 99 that corresponds to the aiming axis 70. Accordingly, when the user looks along the aiming axis 70 through the aiming device 50, the top surface 99 of the peg 98 will visually appear to be in the notch 96 or coplanar with the lower surface 97 of the notch. When the peg 98 and the notch 96 are visually aligned with the aiming target 52, the user has visual confirmation that the horn array 22 and its sound axes 30 and 34 are properly aimed.

Figure 10:
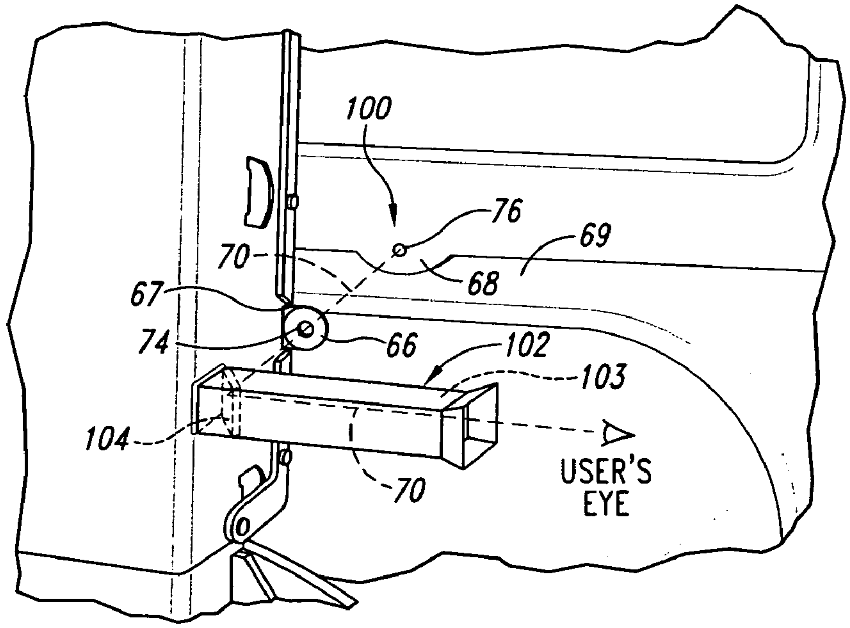
FIG. 10 is an enlarged isometric view of the loudspeaker assembly of FIG. 5 with an aiming device in accordance with yet another embodiment.

FIG. 10 is an enlarged rear isometric view of the speaker assembly 20 with an aiming device 100 in accordance with yet another embodiment. In this embodiment, the aiming device 100 can include substantially identical components of the aiming devices discussed above. The aiming device 100 of this illustrated embodiment further includes a "side looking" or "periscope" feature 102. This feature 102 has a viewing portion 103 out of direct alignment with the aiming axis 70 but in alignment with an angled mirror 104. The angled mirror 104 is in alignment with the aiming axis 70. Accordingly, the mirror 104 provides a reflection of the first and second aiming portions so the user can see along the aiming axis 70 from a position out of direct alignment with the aiming axis.

In the illustrated embodiment, the feature 102 has the viewing portion 103 spaced apart from a single mirror 104 positioned in alignment with the aiming axis 70 and oriented at approximately a 45° angle relative to the aiming axis. Accordingly, the feature 102 allows a user to see the aiming axis 70 from a position normal to the aiming axis. Other embodiments can use more than one angled mirror 104 aligned relative to each other so a user can see, via the reflections, along the aiming axis 70 from a position out of direct alignment with the aiming axis. The embodiments of the aiming device 100 with the "side looking" or "periscope" feature 102 are particularly effective when there is not enough space behind the speaker assembly 20 to allow a user to stand there.

Embodiments of the invention have been described herein for purposes of illustration, but various modifications may be made without deviating from the spirit and scope of the invention. For example, the aiming portions can be two or more aligned pins or needles with the tips aligned with or defining the aiming axis 70. Other embodiments could use different structures that provide two points oriented so a user can visually look along the aiming axis 70, past the two points, through the perforated screen (if present) to the remote aiming target 52 to properly, precisely, and easily aim the speaker assembly 20 relative to a selected target. Further, the speaker assembly 20 is described and illustrated herein in connection with a three-way cinema speaker assembly. The aiming device 50, however, can be used with other speaker assemblies or components thereof to aim one or more sound axis relative to a selected remote target. Accordingly, the invention is not limited except as by the appended claims.

We claim:

1. A loudspeaker assembly aimable relative to a remote target, comprising:

a sound generating device having a horn portion configured to project sound in a sound pattern about a sound axis; and a speaker aiming device coupled to the sound generating device for use in visually aiming the horn portion relative to the remote target such that the sound pattern is positioned to cover a listening area, the speaker aiming device having first and second aiming portions spaced apart from each other and positioned along an aiming axis in a fixed orientation relative to the sound axis, the first and second aiming portions being positioned to allow a user to visually see along the aiming axis past the first and second aiming portions to the remote target.

2. The assembly of claim 1 wherein the sound generating device includes at least one of a high-frequency speaker and a mid-frequency speaker.

3. The assembly of claim 1 wherein the first aiming portion has a viewing hole therethrough coaxially aligned with the aiming axis.

4. The assembly of claim 1 wherein the second aiming portion is a viewing hole through the horn portion coaxially aligned with the aiming axis.

5. The assembly of claim 1 wherein the sound generating device includes a driver, the first aiming portion is coupled to the driver and the second aiming portion has a viewing hole through the horn portion.

6. The assembly of claim 1 wherein at least one of the first and second aiming portions include cross-hairs intersecting at the aiming axis.

7. The assembly of claim 1 wherein the speaker aiming device is a tube substantially coaxially aligned with the aiming axis.

8. The assembly of claim 1 wherein one of the first and second aiming portions includes a notch substantially aligned with the aiming axis, and the other of the first and second aiming portions has a projection substantially aligned with the aiming axis.

9. The assembly of claim 1 wherein the sound generating device is a first sound generating device, the sound pattern is a first sound pattern, and the sound axis is a first sound axis, and the assembly further comprising a second sound generating device configured to project sound in a second sound pattern about a second sound axis, the first and second sound generating devices being oriented so the first and second sound axes converge and intersect at a point substantially on the aiming axis.

10. The assembly of claim 1 wherein the sound generating device is a first sound generating device, the sound pattern is a first sound pattern, and the sound axis is a first sound axis, and the assembly further comprising a second sound generating device configured to project sound in a second sound pattern about a second sound axis, the first and second sound generating devices being oriented so the first and second sound axes converge and intersect at a position away from the aiming axis.

11. The assembly of claim 1 wherein the aiming device includes a mirror in alignment with the aiming axis.

12. A loudspeaker assembly aimable relative to a remote target, comprising:

a first sound generating device positioned to project sound toward the remote target about a first sound axis;

a second sound generating device positioned to project sound toward the remote target about a second sound axis; and a speaker aiming device coupled to the first and second sound generating devices for use in visually aiming the first and second sound generating devices relative to the remote target for projecting broad sound patterns that cover a listening area, the speaker aiming device having first and second aiming portions spaced apart from each other and defining an aiming axis, the aiming axis being in a fixed orientation relative to the first and second sound axes, the first and second aiming portions being configured to allow a user to see along the aiming axis past the first and second portions aiming device to a location relative to the remote target.

13. The assembly of claim 12 wherein the first sound generating device is attached to the second sound generating device.

14. The assembly of claim 12 wherein one of the first and second aiming portions includes a viewing hole extending through a portion of the first or second sound generating devices.

15. The assembly of claim 12 wherein the sound generating device includes a driver and a horn portion, the first aiming portion is coupled to the driver and the second aiming portion has a viewing hole through the horn portion.

16. The assembly of claim 12 wherein the first aiming portion has a first viewing hole facing toward a horn portion of one of the first or the second sound generating devices, and the second aiming portion has a second viewing hole through the horn portion that allows a user to see along the aiming axis through the horn portion.

17. The assembly of claim 12 wherein at least one of the first and second aiming portions includes cross-hairs intersecting at the aiming axis.

18. The assembly of claim 12 wherein the speaker aiming device is a tube substantially coaxially aligned with the aiming axis.

19. The assembly of claim 12 wherein one of the first and second aiming portions includes a notch substantially aligned with the aiming axis, and the other of the first and second aiming portions has a projection substantially aligned with the aiming axis.

20. The assembly of claim 12 wherein the first and second sound generating devices are oriented so the first and second sound axes converge and intersect at a point substantially on the aiming axis.

21. The assembly of claim 12 wherein the first and second sound generating devices are oriented so the first and second sound axes converge and intersect at a position away from the aiming axis.

22. A cinema screen and loudspeaker system for use in a cinema having a viewing area, comprising:

a perforated cinema screen;

a speaker assembly aimable relative to a remote target and facing toward the viewing area with the cinema screen therebetween, the speaker assembly comprising:

a first sound generating device positioned to project sound through the perforated cinema screen in a first sound pattern about a first sound axis;

a second sound generating device positioned to project sound through the perforated cinema screen in a second sound pattern about a second sound axis, the second sound generating device being connected to the first sound generating device in an aimable array; and a speaker aiming device connected to the aimable array and positioned relative to the first and second sound generating devices for use in visually aiming the first and second sound generating devices relative to the remote target such that the first and second sound patterns are positioned to cover the viewing area, the speaker aiming device having first and second aiming portions spaced apart from each other and positioned along an aiming axis in a fixed orientation relative to the first and second sound axes, the first and second aiming portions being positioned to allow a user to visually see along the aiming axis past the first and second portions and through the perforated cinema screen to the remote target.

23. The system of claim 22 wherein the first sound generating device includes a high-frequency speaker and the second sound generating device includes a mid-frequency speaker.

24. The system of claim 22 wherein one of the first or second aiming portions includes a viewing hole extending through a portion of one of the first or second sound generating devices.

25. The system of claim 22 wherein one of the first and second sound generating devices includes a driver and a horn, the first aiming portion is coupled to the driver and the second aiming portion has a viewing hole through the horn.

26. The system of claim 22 wherein the aiming axis is substantially coplanar with the first and second sound axes.

27. The system of claim 22 wherein at least one of the first and second aiming portions includes cross-hairs at the aiming axis.

28. The system of claim 22 wherein the speaker aiming device is a tube substantially aligned with the aiming axis.

29. The system of claim 22 wherein the second aiming portion has an aligning peg with an edge substantially at the aiming axis, and the first aiming portion has a notch aligned with the aiming axis.

30. The system of claim 22 wherein the first and second sound axes converge and intersect at a remote aiming point on the aiming axis.

31. The system of claim 22 wherein the first and second sound axes converge and intersect at a remote aiming point away from the aiming axis.

32. The system of claim 22 wherein the first and second sound generating devices are oriented so at least one of the first or second sound axes converge and intersect the aiming axis at the remote target.

33. A cinema loudspeaker assembly, comprising:

a first sound generating device positioned to project sound in a first sound pattern about a first sound axis;

a second sound generating device coupled to the first sound generating device and positioned to project sound in a second sound pattern about a second sound axis that converges and intersects with the first sound axis at an aiming point remote from the first and second sound generating devices, the first and second sound generating devices being movable as a unit to move the aiming point to a selected position remote from the cinema speaker assembly; and an aiming device for use in visually aiming the first and second sound generating devices relative to the aiming point such that the first and second sound patterns are positioned to cover a listening area, the aiming device having first and second aiming portions that define an aiming axis and through which a user can look toward the aiming point.

34. The assembly of claim 33 wherein the first sound generating device includes a first driver and a high-frequency horn, and the second sound generating device includes a second driver and a mid-frequency horn.

35. The assembly of claim 33 wherein the first and second sound axes intersect at a remote location in the range of approximately 25-100 feet from the first sound generating device.

36. The assembly of claim 33 wherein the first and second sound axes intersect at a remote location in the range of approximately 40-60 feet from the first sound generating device.

* * * * *

UNITED STATES PATENT AND TRADEMARK OFFICE

CERTIFICATE OF CORRECTION

PATENT NO. : 7,367,423 B2
APPLICATION NO. : 10/973649
DATED : May 6, 2008
INVENTOR(S) : Ferrell et al.

It is certified that error appears in the above-identified patent and that said Letters Patent is hereby corrected as shown below:

In Column 2, line 53, after projects, delete ",".

Signed and Sealed this

Ninth Day of September, 2008

JON W. DUDAS
*Director of the United States Patent and Trademark Office*